(12) United States Patent
Frydkjaer

(10) Patent No.: US 12,031,525 B2
(45) Date of Patent: Jul. 9, 2024

(54) NACELLE HOUSING WITH SERVICE HATCH

(71) Applicant: Siemens Gamesa Renewable Energy A/S, Brande (DK)

(72) Inventor: John Frydkjaer, Struer (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/762,433

(22) PCT Filed: Sep. 10, 2020

(86) PCT No.: PCT/EP2020/075267
§ 371 (c)(1),
(2) Date: Mar. 22, 2022

(87) PCT Pub. No.: WO2021/063646
PCT Pub. Date: Apr. 8, 2021

(65) Prior Publication Data
US 2022/0341401 A1  Oct. 27, 2022

(30) Foreign Application Priority Data
Oct. 1, 2019 (EP) ..................................... 19200821

(51) Int. Cl.
*F03D 80/50* (2016.01)
*F03D 80/80* (2016.01)

(52) U.S. Cl.
CPC ............. *F03D 80/50* (2016.05); *F03D 80/88* (2016.05); *F05B 2240/14* (2013.01); *F05B 2260/20* (2013.01); *F05B 2260/64* (2013.01)

(58) Field of Classification Search
CPC ...... F03D 80/50; F03D 80/88; F05B 2240/14; F05B 2260/20; F05B 2260/64
See application file for complete search history.

(56) References Cited

U.S. PATENT DOCUMENTS

2014/0030111 A1* 1/2014 Kohne .................. E06B 9/0638
416/244 R
2014/0050591 A1* 2/2014 Munk-Hansen ........ F03D 80/80
416/244 R (Continued)

FOREIGN PATENT DOCUMENTS

CA    2636182 A1 * 10/2007 ............. F03D 80/60
KR    101638293 B1    7/2016
WO    2004003381 A1    1/2004

OTHER PUBLICATIONS

"Hatch and fence solution for a wind turbine nacelle", Ip.com Journal, Ip.com Inc., West Henrietta, NY, US, Nov. 4, 2016 (Nov. 4, 2016), XP013173355, ISSN: 1533-0001.

(Continued)

*Primary Examiner* — Aaron R Eastman
(74) *Attorney, Agent, or Firm* — Schmeiser, Olsen & Watts LLP

(57) ABSTRACT

A nacelle housing of a nacelle of a wind turbine is provided. The nacelle housing includes a ventilation opening of a cooling system of the wind turbine, a cover closing the ventilation opening, the cover being configured to allow an airflow through the cover and the ventilation opening, and a service hatch for hoisting a load into or out of the nacelle housing. The service hatch is provided by the ventilation opening and the cover, wherein the cover is configured as a service door of the service hatch that is opened to allow the hoisting of a load through the ventilation opening into or out of the nacelle housing. Furthermore, a method of hoisting a load into or out of a nacelle housing of a wind turbine is provided.

13 Claims, 9 Drawing Sheets

(56) References Cited

U.S. PATENT DOCUMENTS

| | | | |
|---|---|---|---|
| 2015/0316024 A1* | 11/2015 | Larsen | F03D 80/50 |
| | | | 104/106 |
| 2016/0195067 A1* | 7/2016 | Mathiasen | F03D 13/20 |
| | | | 52/745.18 |
| 2017/0009746 A1 | 1/2017 | Jain et al. | |
| 2017/0022966 A1* | 1/2017 | Therkildsen | F03D 80/88 |
| 2019/0072078 A1* | 3/2019 | Munk-Hansen | F03D 80/88 |
| 2020/0199894 A1* | 6/2020 | Soerensen | E04G 3/305 |
| 2020/0362824 A1* | 11/2020 | Kofman | F03D 80/50 |
| 2021/0156366 A1* | 5/2021 | Munk-Hansen | F03D 80/88 |
| 2021/0180573 A1* | 6/2021 | Demianovich | F03D 13/20 |
| 2021/0317813 A1* | 10/2021 | Schomacker | F03D 7/0204 |
| 2022/0127114 A1* | 4/2022 | Munk-Hansen | B66C 1/108 |
| 2022/0153560 A1* | 5/2022 | Jayadeva | F03D 80/50 |
| 2022/0235743 A1* | 7/2022 | Baun | F03D 80/50 |

OTHER PUBLICATIONS

PCT International Search Report and Written Opinion of International Searching Authority mailed Jan. 12, 2021 corresponding to PCT International Application No. PCT/EP2020/075267 filed Sep. 10, 2020.

* cited by examiner

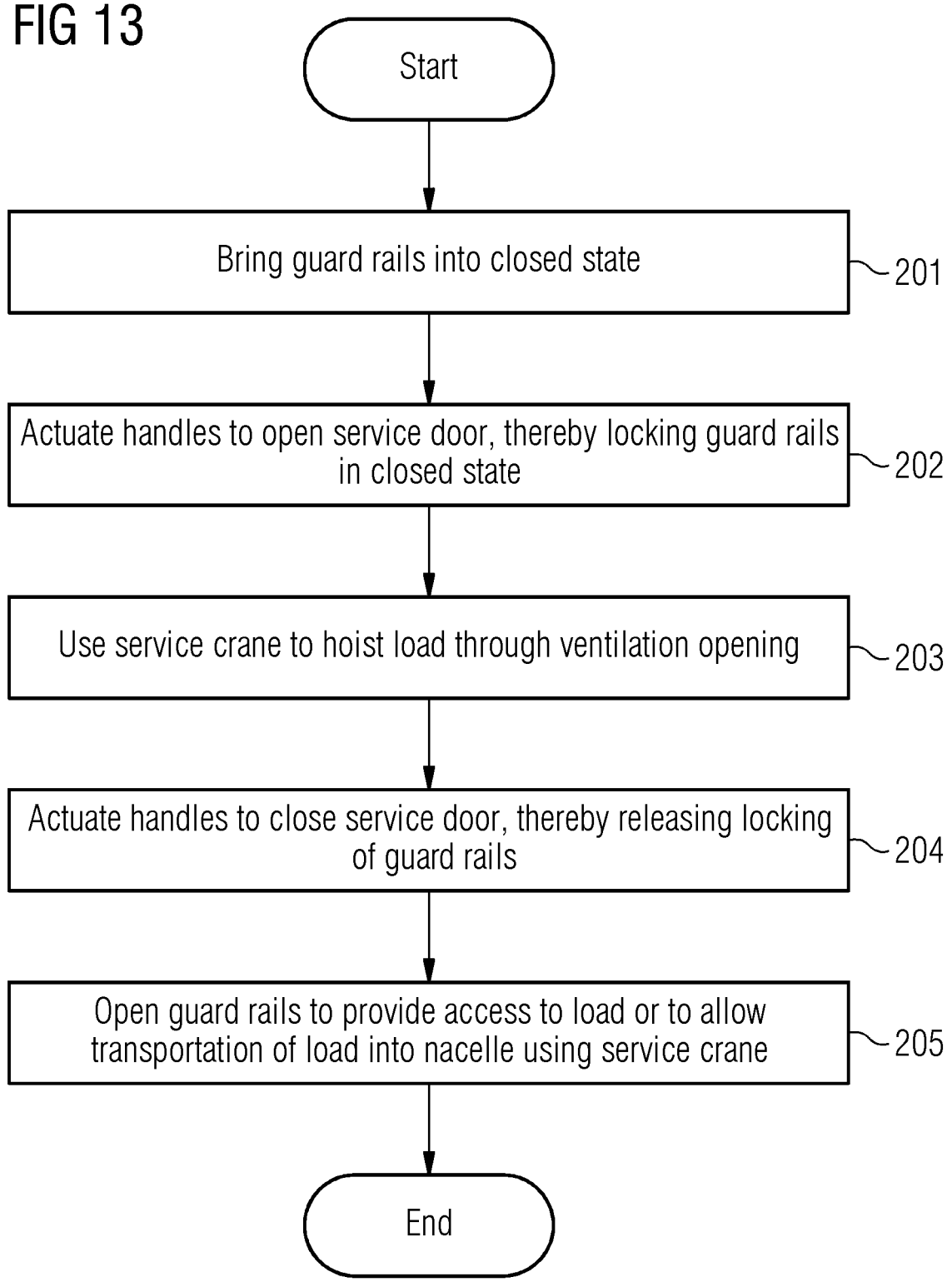

NACELLE HOUSING WITH SERVICE HATCH

CROSS-REFERENCE TO RELATED APPLICATIONS

This application claims priority to PCT Application No. PCT/EP2020/075267, having a filing date of Sep. 10, 2020, which claims priority to EP Application No 19200821.7, having a filing date of Oct. 1, 2019, the entire contents both of which are hereby incorporated by reference.

FIELD OF TECHNOLOGY

The following relates to a nacelle housing of a nacelle of a wind turbine including a service hatch. The following further relates to a method of hoisting a load into or out of a nacelle housing of a wind turbine.

BACKGROUND

Wind turbines, also termed wind turbine generators (WTGs), comprise a nacelle to which a rotor with rotor blades is mounted. The nacelle is installed on top of a wind turbine tower and can generally be rotated by using a yaw drive. The rotor blades convert wind energy into rotational mechanical energy, which in turn is converted into electrical energy by a generator coupled to the rotor and arranged inside the nacelle. The nacelle may host further components, such as a gearbox coupled between rotor and generator (not present in direct drive wind turbines), a converter for providing AC/AC conversion of the generated electrical power, several drives including actuators, such as a yaw drive, blade pitch drives and the like, and respective control electronics.

To service components of the wind turbine, it may be necessary to lift heavy loads into the nacelle. For this purpose, a service crane can be provided inside the housing of the nacelle. The nacelle housing can include a service hatch that can be opened and that allows the crane to lift loads into and out of the nacelle housing.

Such service hatch may for example be disposed in a side wall or in the floor of the nacelle housing. Space is generally quite restricted inside a nacelle, so that placement of the service hatch is difficult. When opened, the service hatch restricts movement of service personnel inside the nacelle. Furthermore, safety equipment may need to be installed around the service hatch prior to opening the service hatch, which further significantly reduces the space available for service technicians to move and work inside the nacelle. The installation of such service hatch is furthermore associated with additional costs.

The document WO 2004/003381 A1 describes a service hatch that is formed in the bottom of the nacelle and extends over most of its length and width. The service hatch is closed by plural plates or shutters that are supported by longitudinally extending girders. When the hatch is fully open, no space is available in the nacelle for service technicians, and no safety mechanisms appear to be provided.

The document "Hatch and fence solution for a wind turbine nacelle", IP.com number IPCOM000248179D, describes a platform of a nacelle of a wind turbine that includes a rectangular opening around which a fence is provided for the purpose of staff security.

It is desirable to provide a more compact and cost-efficient solution. Furthermore, it is desirable to ensure the operational safety of the service technician or operator working in the nacelle of the wind turbine.

SUMMARY

An aspect relates to mitigate at least some of the drawbacks mentioned above and to provide an improved nacelle housing including a service hatch. In particular, it is an aspect of embodiments of the invention to make available a more cost-efficient and less space-consuming solution for providing a service hatch in such nacelle.

According to an embodiment of the invention, a nacelle housing of a nacelle of a wind turbine is provided. The nacelle housing includes a ventilation opening of a cooling system of the wind turbine and a cover closing the ventilation opening, wherein the cover is configured to allow air to flow through the cover and the ventilation opening (i.e. the air can flow through the cover when the cover closes the ventilation opening). The nacelle housing further includes a service hatch for hoisting a load into or out of the nacelle housing. The service hatch is provided by the ventilation opening and the cover. The cover is configured as a service door of the service hatch that can be opened to allow the hoisting of a load through the ventilation opening into or out of the nacelle housing.

By using the ventilation opening as a service hatch, a compact solution can be achieved since it is not necessary to provide a separate ventilation opening and a separate opening for the service hatch. This also results in a more compact nacelle housing and in respective cost-savings. Furthermore, as the service door of the service hatch is provided by the cover of the ventilation opening which passes the airflow (also in the closed state of the service door), it is not necessary to provide an additional service hatch door which generally has to be sealed in the nacelle housing in order to prevent moisture and humidity from entering the interior of the nacelle.

The ventilation opening may in particular be an air inlet of the cooling system.

In an embodiment, the service door of the service hatch comprises at least one foldable wing. Such foldable wings reduce the space required when opening or closing the service door, and thus allow larger loads to be hoisted into the nacelle. This is particularly beneficial when closing the service door below the load after the load has been hoisted into the nacelle. Each foldable wing may for example have two or more elements that are hinged to each other. As an example, the service door may include three, four or more of such elements, which can be part of a single wing or of two or more wings. When the service door is opened and the wings are folded, a compact configuration can thus be achieved. In a preferred configuration, the service door includes two foldable wings, each wing having two such elements.

The width of all elements may lie within 25% or within 20% of the width of the widest element, the width being in a direction perpendicular to the rotation axis of the hinged connection between elements. The service door is thus compact when open.

The service door may comprise a grating or a grille, or a plurality of openings to allow the airflow through the service door and the ventilation opening when the service door is closed. A significant airflow for the cooling system can thus be provided through the service door when the service door is in the closed position. The elements of the service door may in particular consist of such grating or grille, which can be provided in a respective frame.

The nacelle housing may include a sealed cooling room. Such sealed cooling room may for example be provided in a rear part of the nacelle housing, and may in particular include a part or the whole of a rear wall of the nacelle housing. The ventilation opening may be an inlet or outlet opening into this sealed cooling room, preferably an air inlet opening. The sealed cooling room may comprise a door towards the (remaining) interior of the nacelle housing to provide access to the service hatch from the interior of the nacelle housing. The interior may in particular be an inner space surrounded or enclosed by the nacelle housing but not including the cooling room. The cooling room can be sealed towards this interior of the nacelle housing. Accordingly, the remainder of the nacelle housing is protected from humidity and moisture that may enter the sealed cooling room through the ventilation opening.

The ventilation opening and thus the opening of the service hatch is provided in a bottom side of the nacelle housing, in particular in a side facing downwards towards the earth's surface. A rope attached to a winch can thus be lowered down through the ventilation opening in order to hoist a load into the nacelle.

In an embodiment, the nacelle housing comprises a service crane that is extendable or extends inside the nacelle housing to a position above the service hatch, or that is mounted above the service hatch (at least partially). The service crane may for example include a beam or rail, or a rope and pulley that extend to the position above the service hatch, or a winch mounted above the service hatch, or the service crane may include a beam that can be moved or (telescopically) extended such that it reaches to a position above the service hatch. Loads can thus be hoisted efficiently through the ventilation opening into the nacelle housing.

In an embodiment, the service hatch comprises an opening mechanism the actuation of which effects the opening of the service door. The opening mechanism may be a manually operated mechanism, and may include a handle attached to the service door, for example to an element of a wing of the service door. The opening mechanism may also be an electrically, hydraulically or pneumatically operated mechanism. Using a manually operated mechanism has the advantage that the configuration of the service hatch can have a low complexity and can be failure-safe, in particular as no power supply is required. The opening mechanism may for example include a handle that comprises a lever and a grip, the handle being attached to a wing of the service door such that actuation of the handle results in a folding of the wing of the service door and thus in an opening of the service door.

The service hatch comprises a safety barrier configured to restrict access to the service hatch. The safety barrier can have a closed position in which an entrance path for an operator or service technician to a space above the service door is blocked and an open position in which the entrance path is unblocked. The entrance path is in particular a path from the inside (interior space) of the nacelle to the position above the service door, it may for example be a path into the above-mentioned sealed cooling room. For example, the safety barrier may restrict access to the sealed cooling room when in the closed position. The safety barrier may for example be configured to restrict access at least when the service door of the service hatch is an open position.

By such safety barrier, it may be prevented that an operator or service technician enters the space above the service door and thus falls through the service door when the service door is open. Operational safety for personnel can thus be improved.

The safety barrier may in particular be mounted in the opening of a door leading from an interior of the nacelle into a (sealed) cooling room in which the ventilation opening is provided.

The safety barrier may for example be provided by one or more, preferably by two guard rails that are pivotable about a (vertical) hinge connection.

For example, the safety barrier may comprise two barrier elements, in particular two guard rails, wherein the two barrier elements are coupled to each other in such a way that the movement of one of the barrier elements results in a corresponding movement of the other barrier element. Such configuration may prevent that if one of the barrier elements is closed in order to restrict access (for example when the service door is open), an operator may enter the space above the service door through the other barrier element. By such coupling of the barrier elements, operational safety can thus further be increased. Furthermore, providing two barrier elements allows a more compact configuration, in particular as less space is necessary for opening such two barrier elements compared to a single barrier element.

For example, a coupling mechanism comprising a coupling bar and levers at both ends may be provided. Each lever can be connected to one end of the coupling bar and to one of the barrier elements such that movement of one barrier element translates into a movement of the coupling bar, which in turn actuates the other barrier element such that the other barrier element moves in correspondence to the first, actuated barrier element. A lever element may for example be fixed to each barrier element and pivotably connected to the respective end of the coupling bar.

The service hatch comprises a locking mechanism configured to prevent the opening of the service door if the safety barrier is in the open position and/or configured to prevent the opening of the safety barrier when the service door is an open position. In particular, the opening of the service door may be locked if the safety barrier is not closed, and/or the opening of the safety barrier may be locked when the service door is not in a closed position. By means of such locking mechanism, it can be ensured that access to the space above the service door is always restricted by the safety barrier if the service door is in an open position or is partly opened. This provides improved safety for an operator or service technician.

In an embodiment, the service hatch comprises an opening mechanism the actuation of which effects the opening of the service door, and the opening mechanism of the service hatch comprises a handle. Such handle may be manually operated, and it may include a lever arm mounted to the service door, in particular to one of the above-mentioned elements, and may further include a grip at one end. The safety barrier comprises a guide configured to guide the handle from a first position in which the service door is closed to a second position in which the service door is open. The handle and the guide may be shaped such that a movement of the handle from the first position to the second position is locked if the safety barrier is in the open position and/or that, when the handle is in the second position in which the service door is open, the safety barrier is locked in the closed position. By such guide and such handle, a locking mechanism can be provided that has a relatively low complexity, and that is accordingly relatively failure-safe.

Such locking mechanism can for example lock the safety barrier in the closed position all the way along the path that the handle travels from the first position to the second position when opening the service door. Similarly, it can lock the service door in the open position as soon as the safety barrier is moved from its closed position towards an open position.

The guide may be provided by a slot in a plate of the safety barrier or by a slot in a guiding element. The handle may extend through the slot and may comprise a bent section that is configured to interact with the plate or the guiding element to lock the movement of the handle (if the safety barrier is open) or to lock the safety barrier in the closed position (if the service door is open).

The guide and the handle may be shaped such that if the safety barrier is in the closed position and the service door is not in the closed position, the guide catches at an end of the handle (in particular the bent end), such that the handle can be moved in the guide but the safety barrier including the guide cannot be moved to the open position.

The handle may for example comprise two or three bends at its end. The handle may for example be configured such that in an open position of the service door, a first part of the handle extends substantially parallel to the safety barrier, a first bent section causing the handle to extend through the slot in the guide and thus to extend from a first side of the safety barrier towards a second side of the safety barrier, and a second bend causing the handle to extend (at least for some distance) on the other side of the safety barrier to a position beyond the slot of the guide. The second bent section may be followed by a third bent section which includes the grip. The safety barrier can thus not be opened as it catches on the second bent section which extends beyond the slot as soon as the handle is moved out of its first position.

Further, the guide and the handle are shaped such that if the handle is in the first position and the safety barrier is in the open position, an end of the handle (in particular the bent end) catches at a periphery of the guide, such that the handle cannot be moved in the guide to the second position. The handle can accordingly not be moved in order to open the service door. The service door is thus locked in the closed position in an efficient and simple way.

When the safety barrier is not in the closed position, the bent end of the handle, in particular the third bend, extends through the slot towards the other side of the safety barrier, wherein the slot (and thus the guide) is no longer aligned with the section between the first bend and the second bend. The handle can thus not be moved in the guide, but movement of the handle is restricted by the periphery of the slot on which the end of the handle catches.

When the safety barrier is in the closed position, the part of the handle between the first bend and the second bend is aligned with the guide such that the handle moves in the guide, while opening of the safety barrier is prevented as the guide catches on the part of the handle following the second bend, as indicate above.

In a particular embodiment, the service door comprises a first foldable wing and a second foldable wing, and the service hatch comprises a first guard rail and a second guard rail that are configured to restrict access to the service hatch. Each guard rail is hinged in a vertical direction and pivotable such that the guard rails can be opened and closed. The opening mechanism comprises a first handle coupled to the first wing, in particular to a first element thereof, and a second handle coupled to the second wing, in particular to a first element thereof. The first guard rail comprises a first guide configured to guide the first handle and the second guard rail comprises a second guide configured to guide the second handle. Each handle and the respective guide are shaped and arranged such that the handle is operable to open the respective wing of the service door only if the guard rail is in a closed position and that the handle is inoperable when the guard rail is in an open position (in particular when it is not in a closed position). The handle may in particular be rigidly coupled to the respective wing or element of the wing. The first and second guard rails may be coupled together as described above, so as to prevent the opening of only a single guard rail.

According to a further embodiment of the invention, a nacelle comprising a nacelle housing in any of the above configurations is provided. Such nacelle may furthermore comprise the respective cooling system.

The cooling system may for example include at least one heat exchanger and at least one fan configured and arranged to provide an airflow through the ventilation opening (in particular the air inlet) and through the heat exchanger. The nacelle housing may for example include one or more outlet openings, e.g. in a rear wall thereof (i.e. in the wall opposite to the wall at which the rotor is mounted), and the fan may be mounted to such outlet opening to provide an airflow through the air inlet, the heat exchanger and the outlet opening. The cooling system includes two such heat exchangers and two, preferably four, such fans and outlet openings. Besides the inlet opening that is used as the service hatch, additional inlet openings may be provided and may be operated in a conventional way. The ventilation opening, the heat exchanger and the fan may be arranged in a cooling room of the nacelle that is sealed towards the remaining interior of the nacelle.

According to a further embodiment of the present invention, a service hatch for a nacelle of a wind turbine is provided. The service hatch may have any of the above outlined configurations. In some embodiments, the service hatch may not employ the ventilation opening, but may have a dedicated opening in the nacelle housing. Such service hatch may in particular comprise a service door, an opening mechanism for the service door, a safety barrier and a locking mechanism, which may have any of the configurations described herein. Such service hatch can in particular provide an improved operational safety for service technicians and operators working in the nacelle of the wind turbine.

According to a further embodiment of the present invention, a method of hoisting a load into or out of a nacelle housing of a wind turbine is provided. The nacelle housing comprises a ventilation opening of a cooling system of the wind turbine and a cover closing the ventilation opening, wherein the cover is configured to allow a flow of air through the cover and the ventilation opening. The ventilation opening and the cover provide a service hatch for hoisting a load into or out of the nacelle housing. The method comprises opening the cover of the ventilation opening, the cover being configured as a service door of the service hatch, and hoisting a load through the ventilation opening into or out of the nacelle housing. With such method, advantages similar to the ones outlined further above with respect to the nacelle housing may be achieved.

The nacelle housing and the service hatch that are employed in the method may have any of the configurations described herein. Furthermore, any method steps described above or further below with respect to the nacelle housing, the nacelle or the service hatch may form part of embodiments of the method.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein:

FIG. 13 is a flow diagram illustrating a method according to an embodiment of the invention.

DETAILED DESCRIPTION

Figure 1:
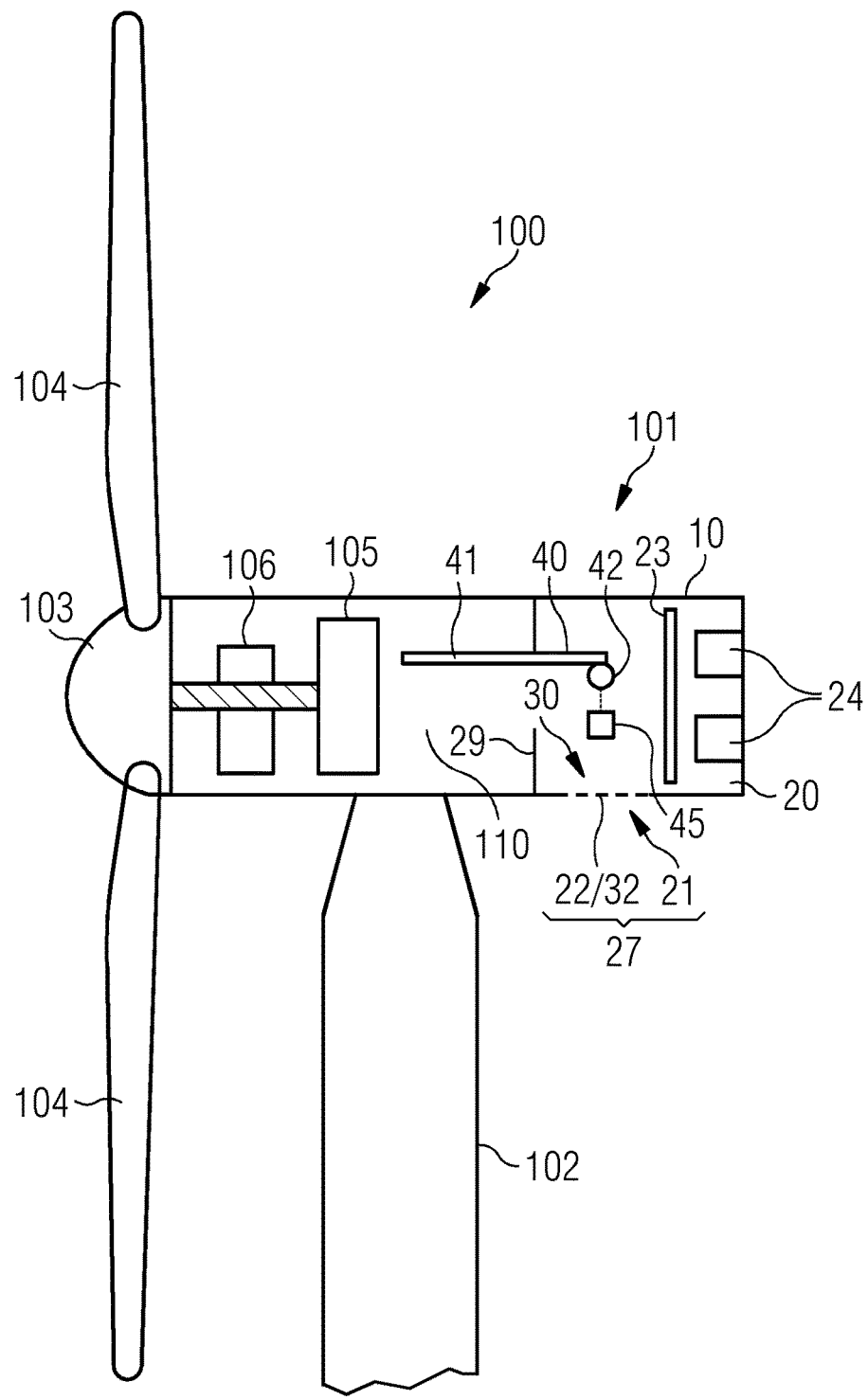
FIG. 1 is a schematic drawing showing a wind turbine including a nacelle with a nacelle housing according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically shows a wind turbine 100 comprising a nacelle 101 including a nacelle housing 10 in accordance with an embodiment of the invention. The nacelle 101 is mounted to a wind turbine tower 102, and a rotor including a rotor hub 103 and rotor blades 104 is mounted to the nacelle 101. The rotor converts wind energy into rotational mechanical energy, which is provided to a generator 105. The rotor can be directly coupled to the generator 105, or a gearbox 106 can be provided to adjust the rotational speed. Further components may be provided inside nacelle 101, such as a converter (not shown) providing AC/AC conversion of generated electric power and control electronics for controlling the components of the wind turbine. A pitch drive mechanism including electric or hydraulic actuators for adjusting the pitch angle of rotor blades 104, a yaw drive for adjusting the orientation of the nacelle 101 and further components may also be provided. Some of these components may require cooling during operation. Accordingly, a cooling system 20 is provided in the nacelle 101, which includes a heat exchanger 23 and a fan 24. The fan 24 circulates air through the heat exchanger 23. Nacelle 101 comprises a corresponding ventilation opening 21 configured as an air inlet and furthermore comprises a corresponding ventilation opening configured as an air outlet. Fan 24 may for example be mounted directly in front of or behind such air outlet.

It should be clear that the cooling system 20 can comprise plural heat exchangers 23, such as two, three, or more, and can comprise plural fans 24, such as two, three, four, six or more.

In the example of FIG. 1, ventilation opening 21 in the nacelle housing 10 serves as an air inlet, yet it may as well serve as an air outlet. Ventilation opening 21 is closed by a cover 22, wherein the cover is permeable to air. Cover 22 may for example comprise a grating, a grille, or any other configuration which may include holes and slots in order to allow air to pass between the outside and the inside of the nacelle housing 10.

The cooling system 20, in particular the heat exchanger 23 and the fan 24 can be arranged in a cooling compartment or cooling room 27 inside the nacelle 101. The cooling room 27 may be sealed against the further interior space 110 inside the nacelle housing 10, such that an exchange of air between the cooling room 27 and the remaining interior space 110 is restricted or prevented. FIG. 1 indicates a wall 29 between these compartments of the nacelle housing 10. This is beneficial as the air that is circulated through the heat exchanger 23 may include moisture and corrosive substances, such as salt in an offshore environment, which can be detrimental to components placed in the remaining interior space 110 of nacelle 101. It should be clear that in other configurations, no such sealed cooling room 27 may be provided.

In the nacelle housing 10, a crane 40 is furthermore provided. Crane 40 may include a beam 41 and a winch 42, yet in other configurations, it may only include such winch 42 mounted above the opening 21. In other implementations, the beam 41 may be a rail extending into the cooling room 27, and the winch 42 may be mounted to a traveling trolley running on such rail so that heavy loads can be moved inside the nacelle 101. In even different implementations, the beam 41 may be a telescopic or movable beam having a pulley at its end and operable to locate a winch rope above the opening 21; the winch 42 may then be provided at the other end of the crane beam 41. Beam 41 may accordingly be movable, or may be fixedly mounted inside the nacelle 101.

In the nacelle housing 10, a service hatch 30 is provided. In particular, the service hatch 30 is provided by the ventilation opening 21 and the cover 22, which is configured as a service door 32. Service hatch 30 thus includes the ventilation opening 21 and the cover 22/service door 32, which can be opened in order to hoist a load 45 by means of service crane 40 into or out of the nacelle 101.

By such configuration, no additional service hatch opening needs to be provided in the nacelle housing 10. Accordingly, the configuration requires less space and is compact. In particular, a compact nacelle housing 10 can be achieved. Further, more space is available for a service technician in the interior 110 of the nacelle 101 (outside the cooling room 27), so that it is easier for the service technician to move, transport components and to perform service work compared to a nacelle housing having an additional service hatch opening disposed in the interior space 110. Furthermore, such solution is also more cost-efficient, since no additional opening needs to be provided in the nacelle housing 10 and since nacelle housing 10 can be made more compact.

Figure 2:
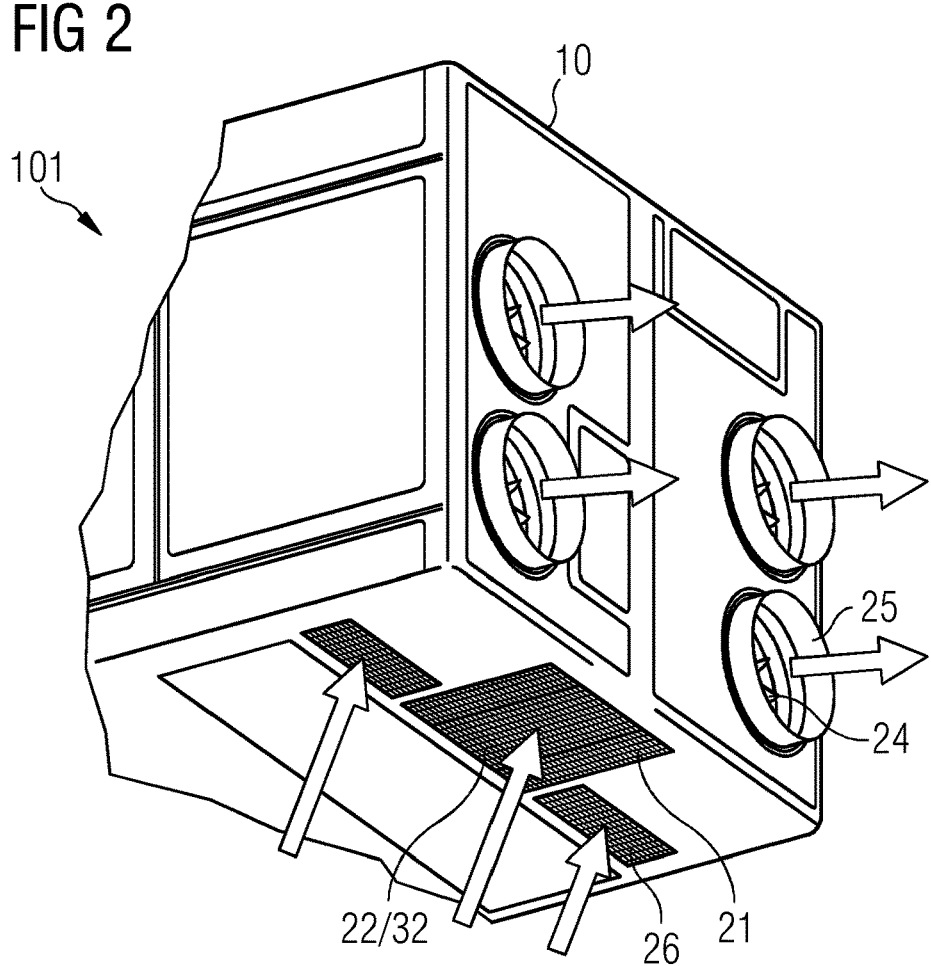
FIG. 2 is a schematic drawing showing a rear part of a nacelle housing according to an embodiment of the invention.

FIG. 2 illustrates a particular implementation of the nacelle housing 10 and the nacelle 101 of FIG. 1, so that the above explanations are equally applicable to the configuration of FIG. 2. As can be seen, the rear wall of the nacelle, i.e. the wall of the nacelle that is opposite to the side on which the rotor is mounted, comprises four ventilation openings 25 configured as air outlets. A fan 24 is mounted in front of each air outlet. The ventilation opening 21 is arranged on the lower side of the nacelle housing 10, in particular in a bottom wall. The ventilation opening 21 is configured as an air inlet, it has a rectangular shape and is closed by the cover 22. Additional inlet openings 26 may certainly be provided, for example next to the ventilation opening 21 as shown in FIG. 2.

Figure 3:
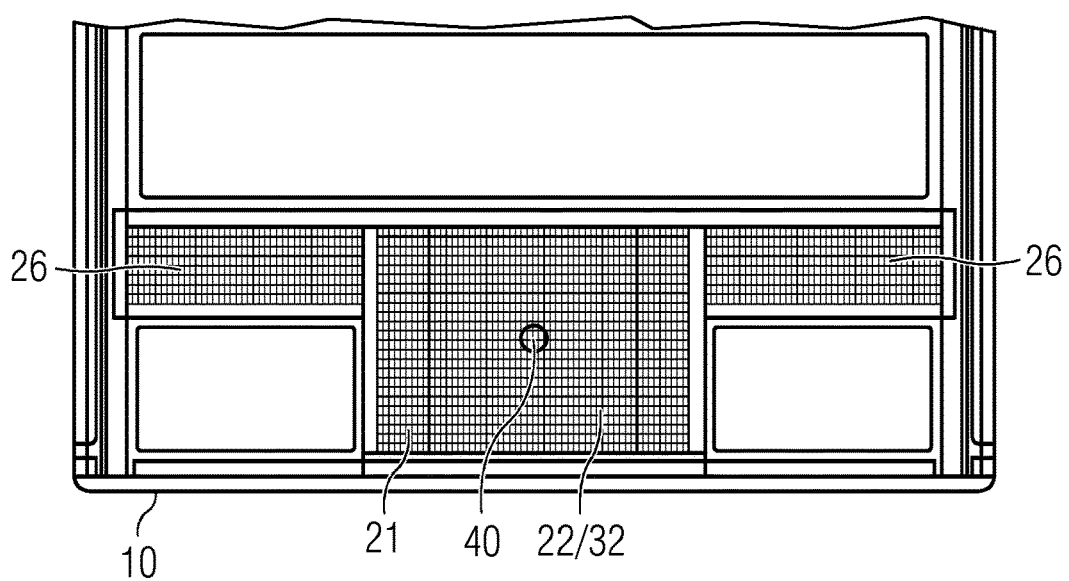
FIG. 3 is a schematic drawing showing a bottom view of the rear part of the nacelle housing of FIG. 2.

The arrangement of the ventilation opening 21 that serves as a service hatch and of the further air inlets 26 is illustrated in the bottom view of FIG. 3. As further indicated, the service crane 40 can be arranged at a position above the ventilation opening 21 so as to be capable of hoisting a load through the ventilation opening 21. The ventilation opening 21 is arranged adjacent to a rear wall of the nacelle housing 10, centered in lateral direction, and has a rectangular shape.

It should be clear that other configurations and shapes of the ventilation opening 21 and of additional inlet openings 26 may be implemented. It should also be clear that the airflow may be reversed, and that the ventilation opening 21 may serve as an air outlet.

Figure 4:
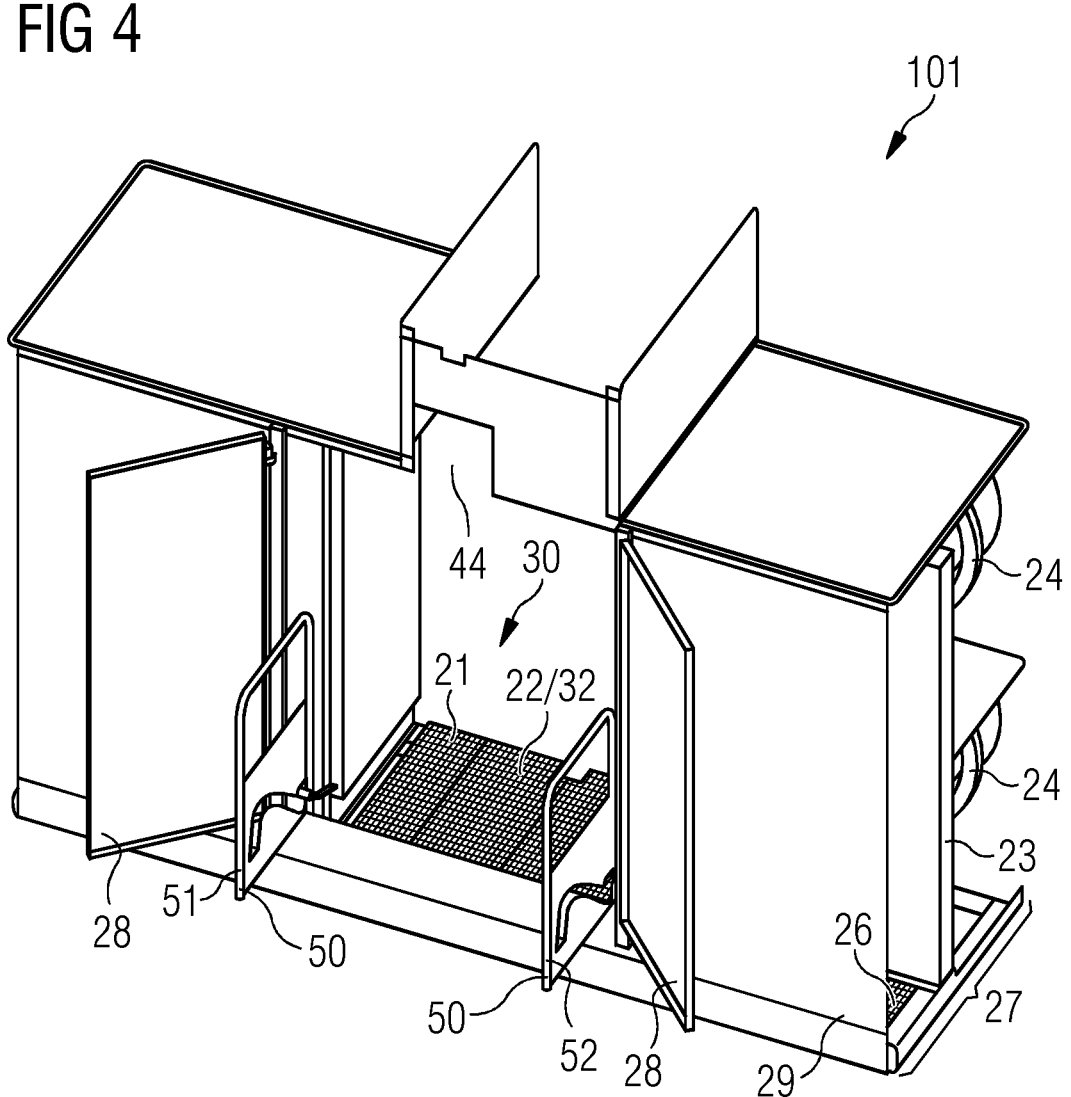
FIG. 4 is a schematic drawing showing a perspective partial view of a nacelle housing including a cooling room in accordance with an embodiment of the invention.

FIG. 4 illustrates the interior of the nacelle housing 10 of FIG. 2, wherein the outer wall of the nacelle housing 10 is not shown. Two fans 24 and one heat exchanger 23 are arranged on either side of the ventilation opening 21, as also shown in FIG. 2. Furthermore, the separation between the cooling room 27 and the further interior space 110 inside the nacelle is visible in FIG. 4. In particular, a dividing wall 29 may separate the cooling room 27 from the remaining interior space 110, and one or more doors 28 may provide access into the cooling room 27. The walls of the cooling room 27 may be sealed against the nacelle housing 10, and by closing the doors 28, the space in the cooling room 27 may be sealed from the remaining interior space 110. In the example of FIG. 4, the dividing wall 29 comprises a recess 44 through which the beam 41 of the service crane 40 can extend into the cooling room 27. The beam 41 is not shown in FIG. 4, but it should be clear that the beam may be sealed against the periphery of recess 44 so as to provide a sealed cooling room 27, or an additional door may be provided to seal against a rail of the service crane 40 on which a trolley comprising the winch runs.

As illustrated in FIG. 4, the service hatch 30 may furthermore comprise a safety barrier 50 which can include barrier elements 51 and 52. These are shown in an open position in FIG. 4, wherein the service door 32 provided by the cover 22 is shown in a closed position. Accordingly, an operator or service technician is allowed to enter the space above the ventilation opening 21 and the service door 32 without the risk of falling through the ventilation opening 21.

Figure 5:
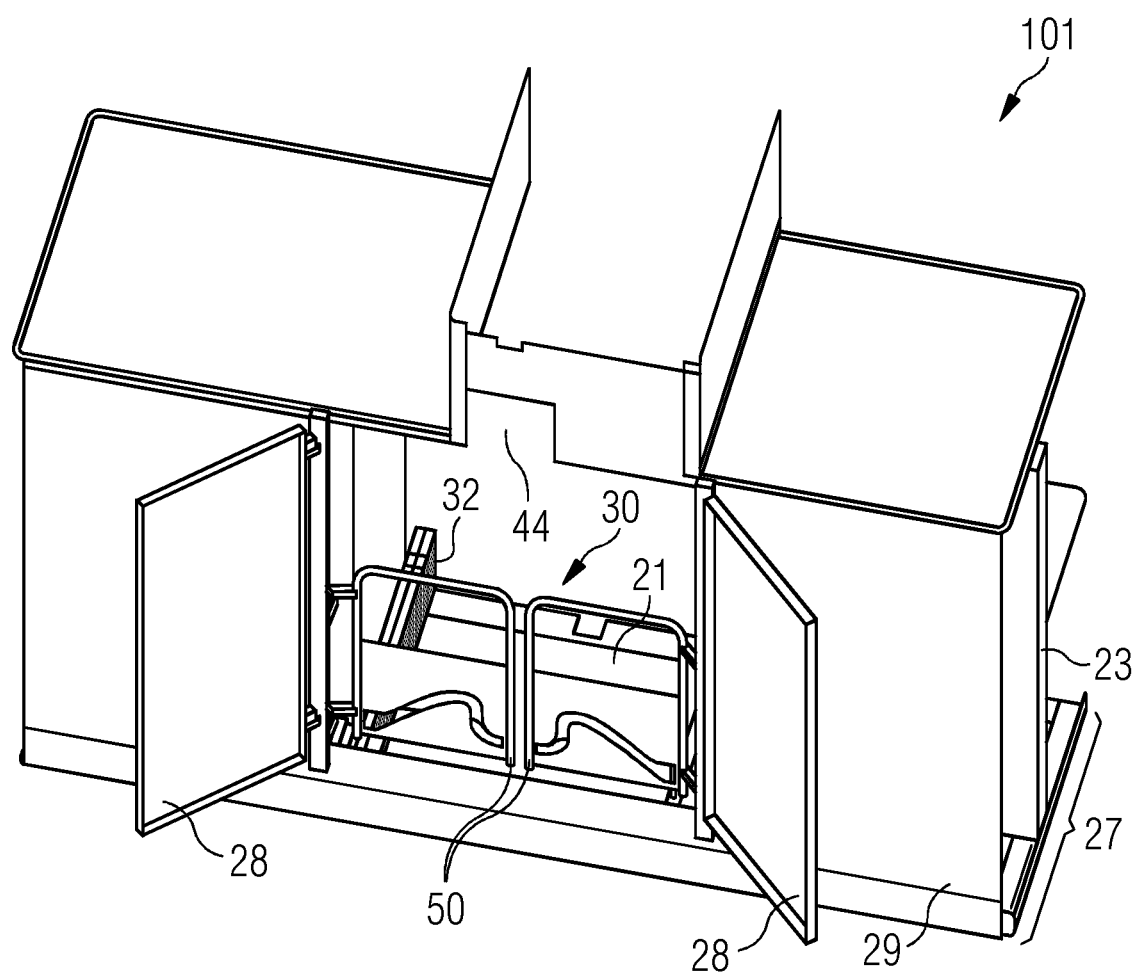
FIG. 5 is a schematic drawing showing a perspective partial view of the nacelle housing of FIG. 4, wherein the service door is open and the safety barrier is in a closed position.

FIG. 5 shows a similar perspective view in which the safety barrier 50 is in a closed position and the service door 32 is in an open position. Accordingly, in such position, access to the area above the ventilation opening 21 is restricted. As the service door 32 is open, a load may be hoisted into or out of the nacelle 101 via the service crane 40. In particular, an entrance path which leads from the interior space 110 into the cooling room 27 through the opening in the dividing wall 29 is blocked by the safety barrier 50 in the closed position thereof. If the safety barrier 50 is opened, the entrance path is again unblocked. The safety barrier 50 is mounted in the door opening in the dividing wall 29 that separates the cooling room 27 from the nacelle interior space 110.

Figure 6:
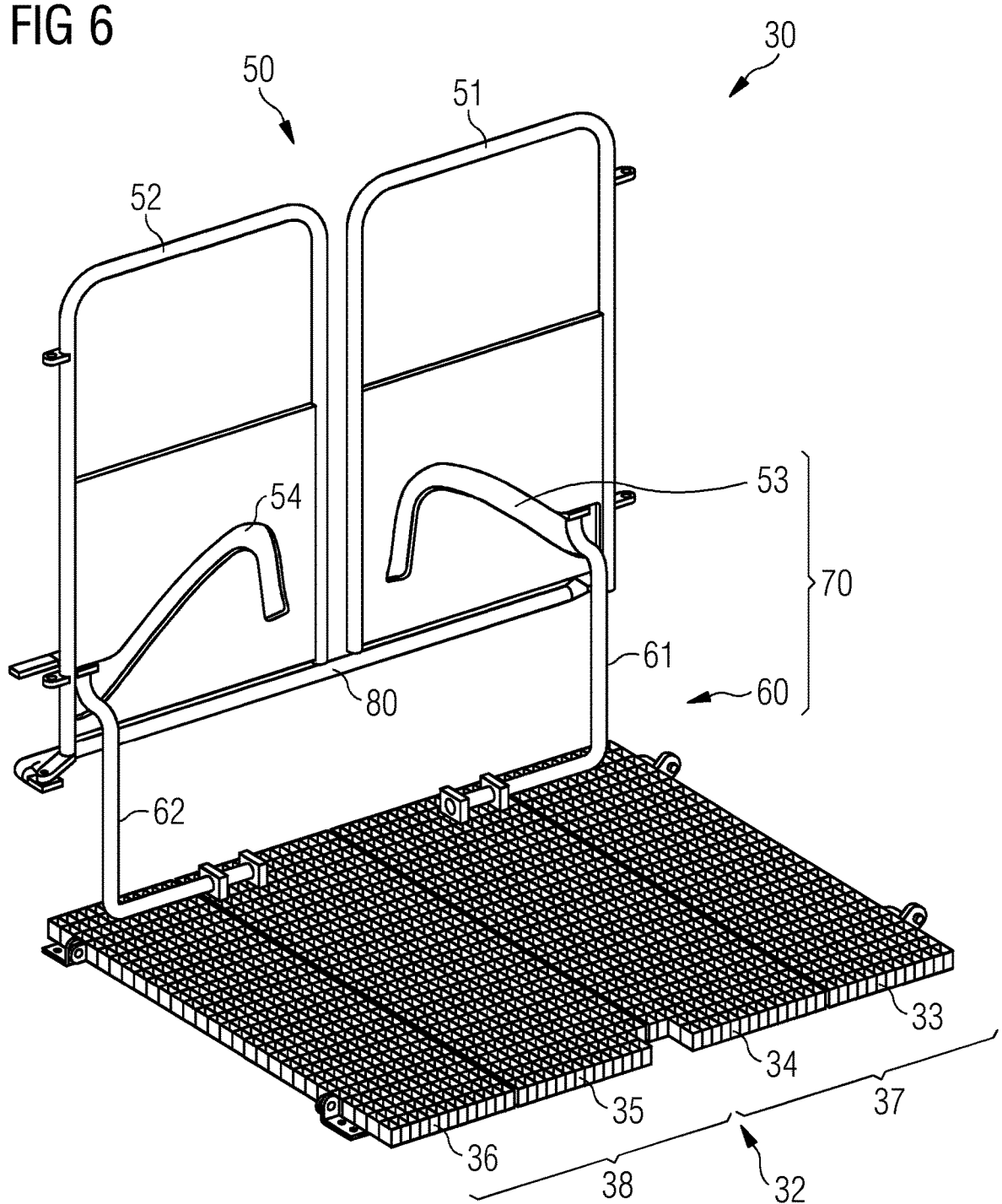
FIG. 6 is a schematic drawing showing a perspective partial view of a service hatch according to an embodiment of the invention.

FIG. 6 schematically illustrates a service hatch 30 according to an embodiment of the invention. The service hatch 30 is shown without the further components of the nacelle housing 10, the cooling system 20 and the cooling room 27, yet it should be clear that the service hatch 30 of FIG. 6 may be employed in any of the above described configurations. Accordingly, the above explanations are equally applicable to service hatch 30 of FIG. 6.

Figure 8:
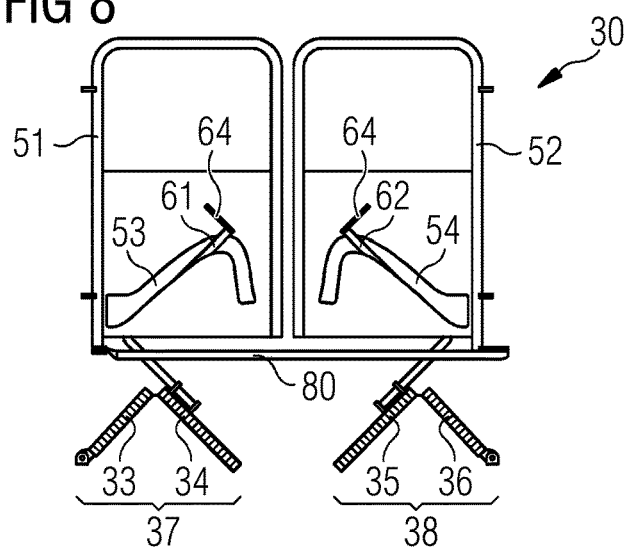
FIG. 8 is a schematic a drawing showing the wings folded according to an embodiment of the invention.

The service door 32 comprises elements 33 and 34 that form a first wing 37 and further comprises elements 35 and 36 that form a second wing 38. The wings 37, 38 are foldable so that when the service door 32 is opened, it only occupies a relatively small space in height direction. In particular, elements 34 and 33 are hinged to each other, and elements 35 and 36 are hinged to each other, so that they can fold as illustrated in FIG. 8. By such configuration, even if a load is hoisted into the nacelle above the service door 32, and the load has a relatively large extension in a height direction, the service door 32 can be closed without interfering with the load. Such configuration accordingly allows the hoisting of large loads. The service door is configured to open in a transverse direction of the nacelle housing, i.e. in the direction towards the side walls. A relatively large opening can thus be provided while keeping the extension of the cooling room in longitudinal direction (back to front) relatively small.

The elements 33 to 36 are formed as gratings, grids or grilles and act as the cover 22 of the ventilation opening 21, they in particular allow the passing of air even when the service door 32 is in a closed position. It should be clear that other configurations of the service door are conceivable, such as providing only a single wing, which may have two, three, four, six or even more elements; providing two wings each having two, three, four or even more elements, or providing only single wing having a single element.

Service hatch 30 further includes an opening mechanism 60 that is actuatable to open the service door 32. In the embodiment of FIG. 6, the opening mechanism 60 includes a first handle 61 coupled to the first wing 37 and a second handle 62 coupled to the second wing 38. Handles 61 and 62 are manually operated, each handle being coupled to one element of the respective wing and being movable so as to fold the respective wing, thereby opening the service door 32. In other configurations, an electric motor or a hydraulic or pneumatic actuator may be provided to open the service door 32, in particular to fold each wing of the service door 32. Providing a manually operated handle has the advantage that the configuration has a low degree of complexity, is long-lived and failure-proof.

The safety barrier 50 includes first and second barrier elements 51, 52, which are provided in the form of guard rails in the embodiment of FIG. 6. These guard rails can for example be hinged to a wall of the nacelle housing 10, such as the dividing wall 29, and can pivot around the vertical axis to move from the closed position shown in FIG. 6 to an open position as shown in FIG. 4. The safety barrier 50, in particular each barrier element 51, 52 has a respective guide 53, 54, which is in the example of FIG. 6 provided in the form of a slot. It should be clear that other kinds of guides may as well be used. The guides 53 and 54 are configured to guide the respective handle 61, 62 when the opening mechanism 60 is actuated.

Figure 7:
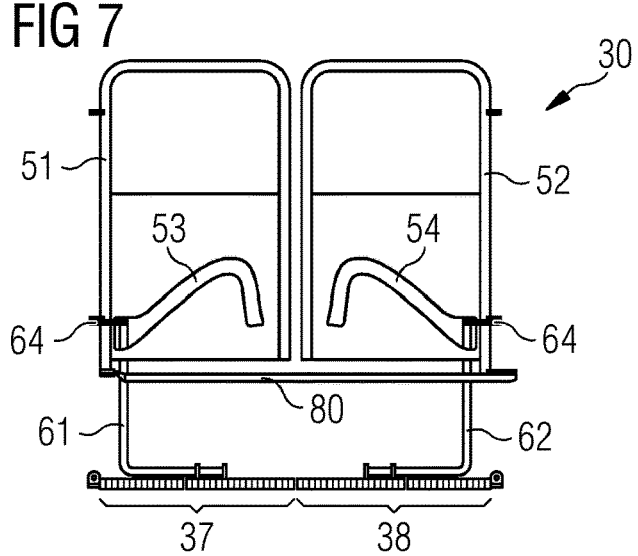
FIG. 7 is a schematic drawing of a service door is in a closed position and wings are unfolded according to an embodiment of the invention.
Figure 9:
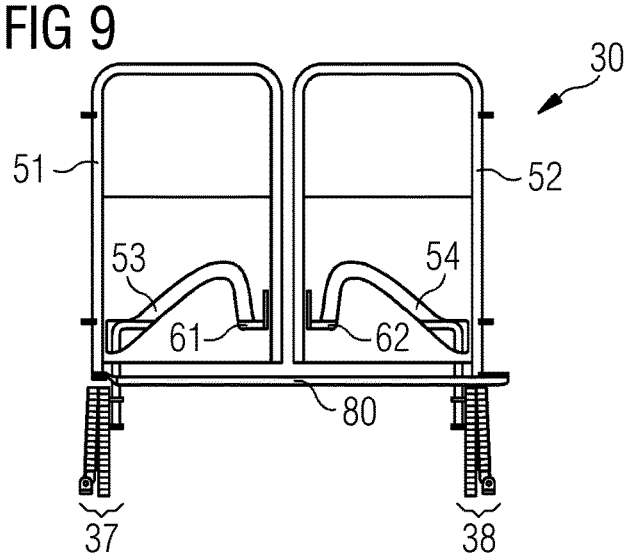
FIG. 9 is a schematic drawing showing a partial front view of the service hatch of FIG. 6 6, wherein the service door is moved from a closed position to an open position.

This is illustrated in FIGS. 7 to 9. In FIG. 7, the service door 32 is in the closed position and the wings 37, 38 are unfolded. Handles 61, 62 comprise a grip 64 at each respective end. The grip can be gripped by the operator and the handles 61, 62 can be moved to open the service door 32, wherein movement is guided by the respective slot 53, 54. As shown in FIG. 8, the wings 37, 38 start to fold and give free the opening of the service hatch as the handles 61, 62 move from their initial (first) position towards their final position. FIG. 9 illustrates the situation in which the handles 61, 62 have reached their final (second) position in which the wings 37, 38 are folded and in which the service door 32 is in an open position. A load can now be hoisted through the service hatch 30, in particular through the ventilation opening 21.

Figure 10:
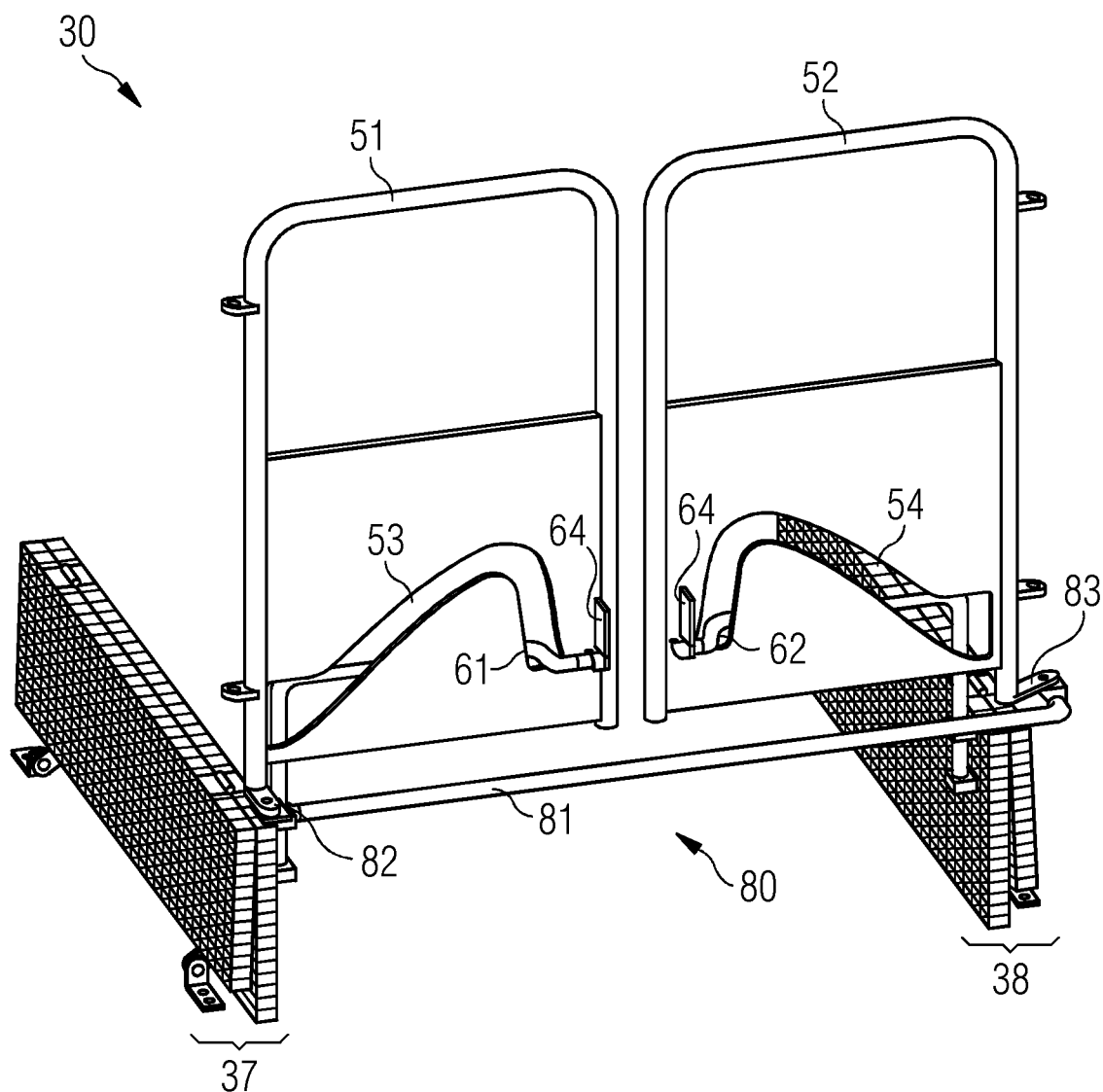
FIG. 10 is a schematic drawing showing a perspective partial view of the service hatch of FIG. 6 6, wherein the service door is in an open position.

Turning back to FIG. 6, the service hatch 30 furthermore comprises a locking mechanism 70. The locking mechanism is in the example of FIG. 6 implemented by the first and second handles 61, 62 and the first and second guides 53 and 54. These are in particular configured to interact in such way that when the handle 61, 62 is in the second, final position, in which the service door 32 is open, the handle prevents the respective barrier element to be opened. As can be seen FIGS. 6, 9 and 10, the handle has a portion that extends substantially parallel to the barrier element when the barrier element is in the closed position on the side of the barrier element facing the service door 32. The handle 61, 62 further includes a first bent portion that causes the handle to extend through the respective slot 53, 54 and towards the other side of the respective barrier element. The handle further comprises a second bent portion that extends beyond the periphery of the respective slot such that the barrier element is blocked from moving past the handle and from opening in a direction away from the service door 32. It should be clear that an opening of the respective barrier element in a direction towards the service door 32 is similarly blocked by the respective handle, but it may also be blocked in a different way, for example by providing respective hinges that do not open in this direction. The sequence of FIGS. 7 to 9 illustrates that as soon as the handle 61, 62 moves from the first position (in which the door is closed) towards the second position and is guided in the respective slot 53, 54, the barrier element 51, 52 is locked and cannot be opened. Consequently, as soon as the service door 32 starts to open and the part of the handle, and in particular the grip 64, is placed in front of the respective service barrier, access to the service hatch and to the respective opening is blocked. Operational safety can thereby be improved.

If one wing of the service door 32 is open, thus locking the respective barrier element, while the other wing is closed and thus allowing the other barrier element to be opened, a dangerous situation can occur since the operator would be able to step into the service hatch while part of the service door is open. To avoid such situation, the first and second barrier elements 51, 52 are coupled by a coupling mechanism 80. The coupling mechanism 80 includes a coupling bar 81 and levers 82, 83 that are coupled to the end of the coupling bar 81 and that are furthermore connected to the respective barrier element 51, 52 (see FIG. 10). The coupling mechanism 80 is configured such that movement of the barrier elements 51, 52 is synchronized, i.e. if one of the barrier elements 51, 52 is opened, the other barrier element follows automatically. For example, opening the barrier element 51 shown in FIG. 10 pulls the coupling bar 81 via the lever element 82, which in turn actuates via the lever element 83 the second barrier element 52 and causes it to open as well. Accordingly, by means of such coupling bar or rod 81, synchronization of the two guard rails can be achieved and one guard rail automatically follows the movement of the other guard rail. This way, if only one of the wings 37, 38 is opened and locks the respective guard rail, the other guard rail is automatically locked as well as it cannot be moved independently.

Figure 11:
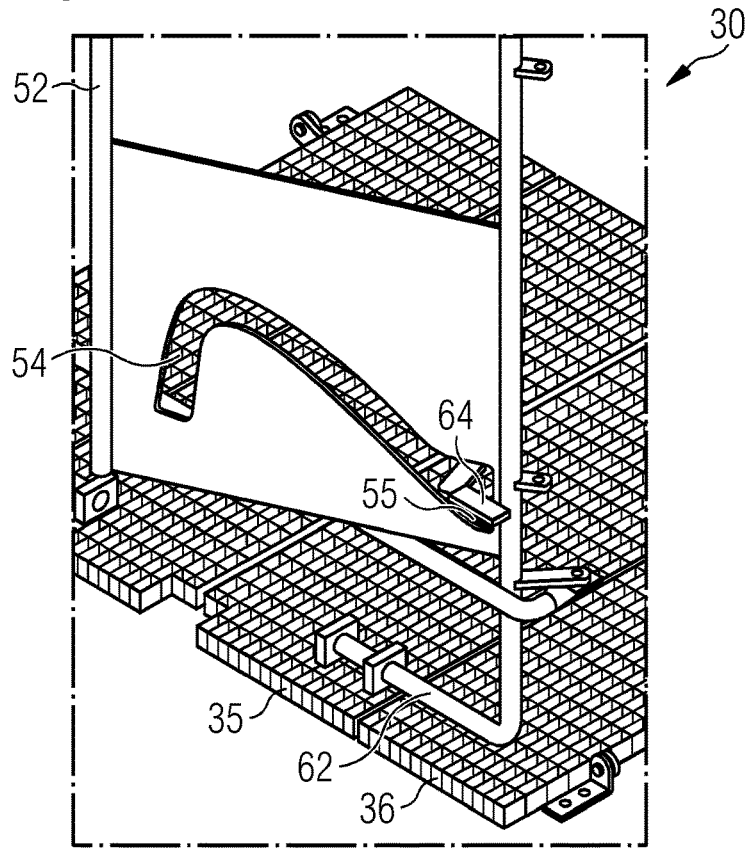
FIG. 11 is a schematic drawing showing a perspective partial view of the service hatch of FIG. 6, wherein the safety barrier is slightly opened.
Figure 12:
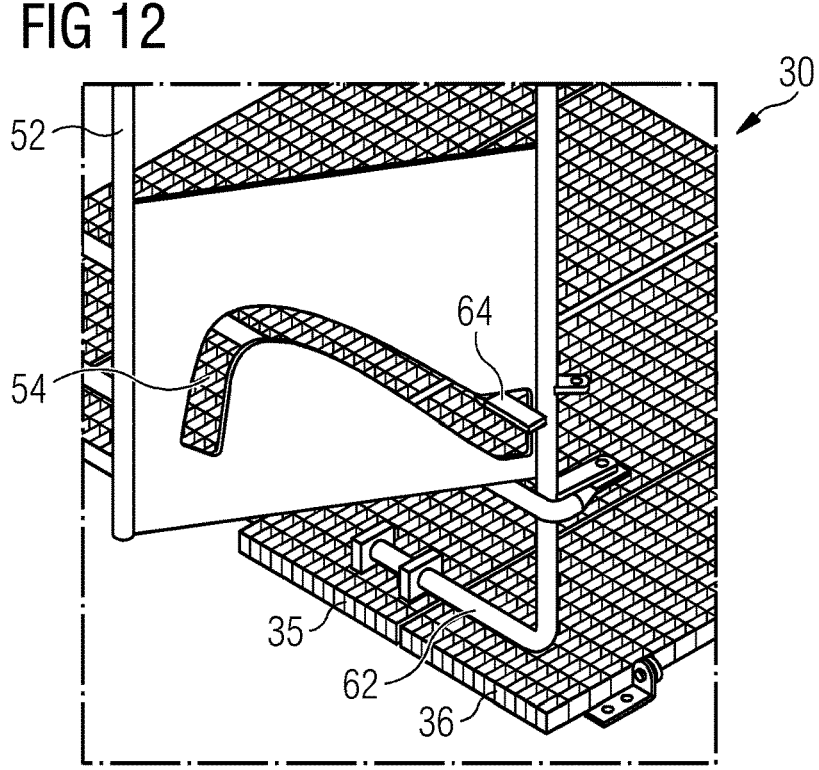
FIG. 12 is a schematic drawing showing perspective partial views of the service hatch of FIG. 6, wherein the safety barrier is moved towards an open position.

Turning back to FIG. 6, the locking mechanism 70, in particular the first and second handles 61, 62 and the first and second guides 53, 54 are configured such that when the safety barrier 50 is opened (in particular, when it is not closed), the actuation of the opening mechanism 60 is blocked. As shown in FIG. 7, each handle 61, 62 has at its end a grip 64 that extends on the side of the barrier element facing away from the service door in a direction that corresponds to the direction in which the barrier elements can be opened. FIG. 11 shows the situation in which the barrier element 52 is only slightly opened. As can be seen, the grip 64 of the handle 60 restricts movement of the handle 62 as the grip 64 is caught by the guide 54, in particular by the outer periphery of the slot. The situation is identical in FIG. 12 where the barrier element 52 is further opened. In particular, the end of the handle 62 extends far enough such that in a fully open position of the barrier element 52, the handle 62 is still locked and cannot be moved to open the service door 32. The accidental opening of the service door 32 when the safety barrier 50 is not closed can thus be prevented. Operational safety can thereby be improved.

It should be clear that the service hatch as described with respect to FIGS. 6 to 12 may be employed in any of the above outlined embodiments of the nacelle 101 and the nacelle housing 10. Further, it should be clear that the service hatch 30 may be modified in several ways. For example, the safety barrier 50 may only comprise a single guard rail, or may comprise one or more barrier elements having a different configuration, such as a door. Also, it should be clear that the shape of the guides 53, 54 and of the handles 61, 62 may be varied while still achieving the above described locking mechanism. Even further, it should be clear that the service door 32 may only comprise a single wing, and only a single handle may accordingly be provided. The locking mechanism 70 implements both, the locking of the safety barrier 50 in the closed position when the service door 32 is not in a closed position, and the locking of the service door 32 in the closed position when the safety barrier 50 is not in a closed position. In some embodiments, the service hatch may include a separate opening in the interior space 110 of the nacelle 101.

FIG. 13 illustrates a flow diagram of a method according to an embodiment. In step 201, the guard rails 51, 52 are brought into a closed state, as for example illustrated in FIG. 6. In step 202, the handles 61, 62 are actuated to open the service door, whereby the guard rails are locked in the closed state. This is illustrated in FIGS. 7 to 9. A service crane is then used to hoist a load through the ventilation opening 21 (step 203). This may involve the movement of a traveling trolley to which a winch is attached and that moves on a rail in the nacelle to a position above the ventilation opening 21 prior to opening the service door 32. Once the service door is opened, the winch may be actuated to let out winch rope (e.g. steel wire) through the ventilation opening, to which the load is attached. The rope may then be reeled in by operation of the winch, thereby lifting the load into the nacelle. In step 204, the handles 61, 62 are actuated to close the service door 32, thereby releasing the locking of the guardrails 51, 52. The guardrails are then opened in step 205 to provide access to the load. The load may for example be lowered onto the (closed) service door 32, and may be picked up by the service technician, or the load may be transported by means of the traveling trolley along the rail into the interior space 110 of the nacelle. As mentioned above, the service crane may in other configurations include a telescopic and/or movable boom, which may be controlled to transport the load into the nacelle.

A secure service hatch can thus be provided that can be operated efficiently and that in particular does not use additional space in the nacelle 101. A compact, safe and cost-efficient solution is thereby provided.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A nacelle housing of a nacelle of a wind turbine, comprising:
   a ventilation opening of a cooling system of the wind turbine, the cooling system including at least one fan and at least one heat exchanger and configured and arranged to provide an airflow through the ventilation opening;
   a cover closing the ventilation opening, the cover being configured to allow the airflow through the cover and the ventilation opening; and
   a service hatch for hoisting a load into or out of the nacelle housing, wherein the service hatch is provided by the ventilation opening and the cover;
   wherein the cover is configured as a service door of the service hatch that can be opened to allow a hoisting of a load through the ventilation opening into or out of the nacelle housing;
   wherein the service door comprises a grating, a grille or plural openings to allow the airflow through the service door and the ventilation opening when the service door is closed;
   wherein the service hatch comprises a safety barrier configured to restrict access to the service hatch, the safety barrier having a closed position in which an entrance path for an operator to a space above the service door is blocked and an open position in which the entrance path is unblocked, further wherein the safety barrier comprises two barrier elements coupled to each other in such a way that a movement of one of the barrier elements results in a corresponding movement of the other barrier element.

2. The nacelle housing according to claim 1, wherein the service door of the service hatch comprises at least one foldable wing.

3. The nacelle housing according to claim 2, wherein the at least one foldable wing has two or more elements that are hinged to each other.

4. The nacelle housing according to claim 1, wherein the nacelle housing comprises a service crane that is extendable or extends inside the nacelle housing to a position above the service hatch, or that is mounted above the service hatch.

5. The nacelle housing according to claim 1, wherein the service hatch comprises an opening mechanism, the actuation of which effects the opening of the service door, further wherein the opening mechanism is a manually operated mechanism or is an electrically, hydraulically or pneumatically operated mechanism.

6. The nacelle housing according to claim 1, wherein the service hatch comprises a locking mechanism configured to prevent an opening of the service door if the safety barrier is in the open position and/or configured to prevent an opening of the safety barrier when the service door is in an open position.

7. The nacelle housing according to claim 1, wherein the service hatch comprises an opening mechanism, the actuation of which effects the opening of the service door, the opening mechanism of the service hatch comprising a handle, and
   wherein the safety barrier comprises a guide configured to guide the handle from a first position in which the service door is closed to a second position in which the service door is open,
   wherein the handle and the guide are shaped such that:
      a movement of the handle from the first position to the second position is locked if the safety barrier is in the open position and/or
      when the handle is in the second position in which the service door is open, the safety barrier is locked in the closed position.

8. The nacelle housing according to claim 7, wherein the guide is provided by a slot in a plate of the safety barrier or by a slot in a guiding element, the handle extending through the slot and comprising a bent section configured to interact with the plate or the guiding element to lock a movement of the handle or to lock the safety barrier in the closed position, respectively.

9. The nacelle housing according to claim 7, wherein the guide and the handle are shaped such that if the handle is in the first position and the safety barrier is in the open position, an end of the handle catches at a periphery of the guide such that the handle cannot be moved in the guide to the second position.

10. The nacelle housing according to claim 7, wherein the guide and the handle are shaped such that if the safety barrier is in the closed position and the service door is not in the closed position, the guide catches at an end of the handle such that the handle is moved in the guide but the safety barrier including the guide cannot be moved to the open position.

11. The nacelle housing according to claim 1, wherein the service door comprises a first foldable wing and a second foldable wing,
   wherein the service hatch comprises a first guard rail and a second guard rail that are configured to restrict access for an operator to the service hatch, wherein each guard rail is hinged in a vertical direction and pivotable such that the guard rails are opened and closed, wherein the opening mechanism comprises a first handle coupled to the first wing and a second handle coupled to the second wing, wherein the first guard rail comprises a first guide configured to guide the first handle and wherein the second guard rail comprises a second guide configured to guide the second handle, each handle and respective guide being shaped and arranged such that the handle is operable to open the respective wing of the service door only if the guard rail is in a closed position, and that the handle is inoperable when the guard rail is in an open position.

12. A method of hoisting a load into or out of a nacelle housing of a wind turbine, wherein the nacelle housing comprises a ventilation opening of a cooling system of the wind turbine, the cooling system including at least one fan and at least one heat exchanger and configured and arranged to provide an airflow through the ventilation opening, and a cover closing the ventilation opening, the cover being configured to allow the airflow through the cover and the ventilation opening, wherein the ventilation opening and the cover provide a service hatch for hoisting a load into or out of the nacelle housing, the cover being configured as a service door of the service hatch, wherein the service door comprises a grating, a grille or plural openings to allow the airflow through the service door and the ventilation opening when the service door is closed, wherein the service hatch comprises a safety barrier configured to restrict access to the service hatch, the safety barrier having a closed position in which an entrance path for an operator to a space above the service door is blocked and an open position in which the entrance path is unblocked, further wherein the safety barrier comprises two barrier elements coupled to each other in such a way that a movement of one of the barrier elements results in a corresponding movement of the other barrier element the method comprising:

opening the cover of the ventilation opening, and
hoisting a load through the ventilation opening into or out of the nacelle housing.

13. A nacelle housing of a nacelle of a wind turbine, comprising:

a ventilation opening of a cooling system of the wind turbine, the cooling system including at least one fan and at least one heat exchanger and configured and arranged to provide an airflow through the ventilation opening;

a cover closing the ventilation opening, the cover being configured to allow the airflow through the cover and the ventilation opening; and a service hatch for hoisting a load into or out of the nacelle housing, wherein the service hatch is provided by the ventilation opening and the cover;

wherein the cover is configured as a service door of the service hatch that can be opened to allow a hoisting of a load through the ventilation opening into or out of the nacelle housing;

wherein the service door comprises a grating, a grille or plural openings to allow the airflow through the service door and the ventilation opening when the service door is closed;

wherein the service hatch comprises a safety barrier configured to restrict access to the service hatch, the safety barrier having a closed position in which an entrance path for an operator to a space above the service door is blocked and an open position in which the entrance path is unblocked;

wherein the service hatch comprises an opening mechanism, the actuation of which effects the opening of the service door, the opening mechanism of the service hatch comprising a handle, and wherein the safety barrier comprises a guide configured to guide the handle from a first position in which the service door is closed to a second position in which the service door is open, wherein the handle and the guide are shaped such that:
 a movement of the handle from the first position to the second position is locked if the safety barrier is in the open position and/or
when the handle is in the second position in which the service door is open, the safety barrier is locked in the closed position.

* * * * *